May 6, 1930.　　　　S. V. HOLMES　　　　1,757,088
GAME APPARATUS
Filed Jan. 11, 1930
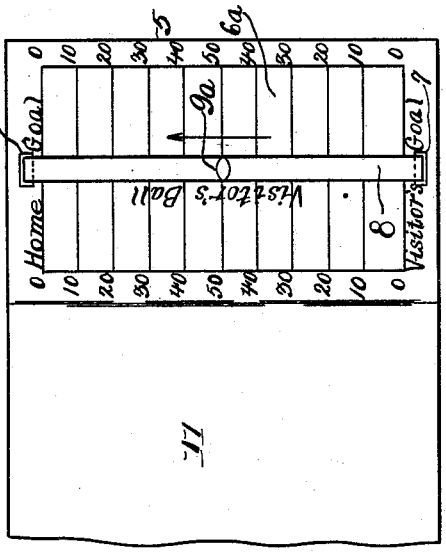
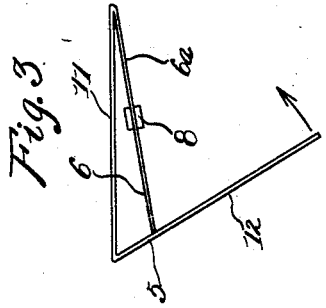
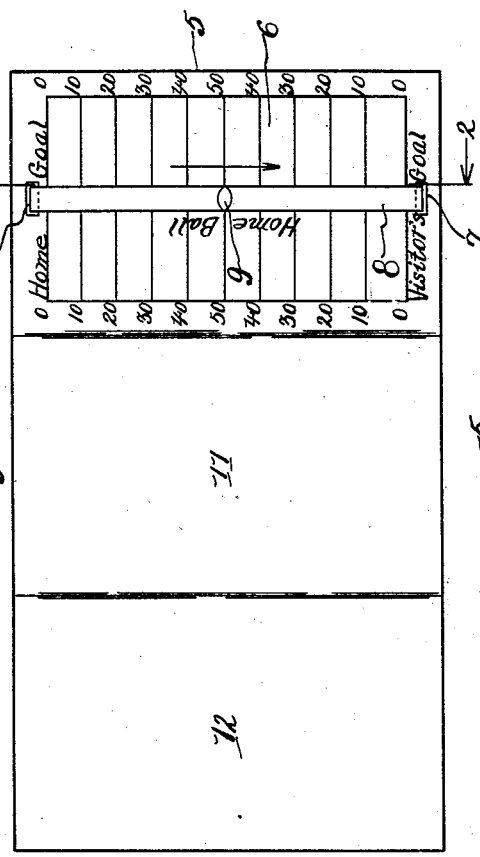
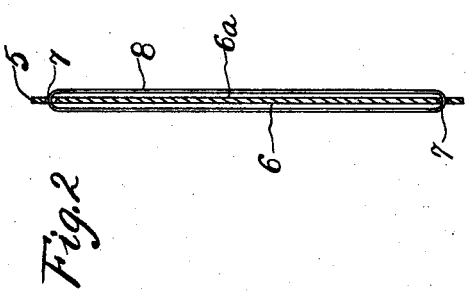
Inventor
Sydney V. Holmes
By Stryker & Stryker
Attorneys Patented May 6, 1930

1,757,088

UNITED STATES PATENT OFFICE

SYDNEY V. HOLMES, ST. PAUL, MINNESOTA, ASSIGNOR TO ELIZABETH B. HOLMES, OF ST. PAUL, MINNESOTA

GAME APPARATUS

Application filed January 11, 1930. Serial No. 420,113.

This invention relates to game apparatus for use in connection with foot ball games, and particularly, although not exclusively, adapted for use as an indicator of the progress of a game in connection with an audible report, such as a radio or telegraphic report of the game.

It is my object to provide a simple and inexpensive device adapted to indicate on separate fields of play the progress of each contestant or team, while reducing the manual operations of the user to a minimum. The device further facilitates the making of a diagrammatic record of the game.

The invention also includes certain novel features of construction which will be more fully pointed out in the following specification and claims.

In the drawings, which illustrate the best form of my device at present known to me, Figure 1 shows one side of a suitable folder having my indicator thereon; Fig. 2 is a section taken on the line 2—2 of Fig. 1; Fig. 3 shows the method of folding the card to protect the indicator and Fig. 4 illustrates the reverse or opposite side of the device from that shown in Fig. 1.

I prefer to construct my device on a card or folder 5 of suitable paper board, celluloid, or like sheet material having printed or otherwise displayed on one face thereof a representation of a foot ball field 6. This field of play is preferably divided by parallel cross lines to represent the usual "gridiron" and has the goal lines at opposite ends with suitable legends indicating that each goal is that of one of the contestants. Slots or openings 7 near each end of the field 6 are provided to receive and guide an endless tape 8 having at one point thereon an indicator 9 which is movable with the tape to indicate the progress of one of the teams or contestants. Upon the opposite or reverse side of the card 5 is a representation of a field $6^a$. This field $6^a$ is a substantial duplicate of the field 6 and the tape 8 extends from end to end of the field $6^a$ and has an indicator $9^a$ thereon similar to the indicator 9. The tape 8 is loose enough to permit the insertion of the user's fingers between the card and tape in moving the latter.

The field 6 and indicator 9 are provided to indicate the progress of one of the contestants, such as the home team and the field $6^a$ and indicator $9^a$ is adapted to indicate the progress of the other contestant, or visitor, without a separate or distinct manual operation. It will further be understood that the fields 6 and $6^a$ are so arranged that when the indicator 9 on one face of the card is moved toward the visitor's goal, the indicator $9^a$ on the opposite face of the card will be moved toward the visitor's goal. Similarly, the indicators move in unison toward the home goals on opposite faces of the card. The card 5 may be divided by suitable crease lines into panels, such as the panels 11 and 12, which may be folded to protect the fields 6 and $6^a$ together with the tape 8, when not in use, as indicated in Fig. 3. Any of a number of tough, smooth and flexible materials may be employed in the construction of the tape 8. Cloth and paper ribbons have been used successfully.

In use, the device makes an audible report, such as a radio or telegraphic report of the game, much more enjoyable because of the graphic nature of the record and ease with which the progress of the play can be followed. When the ball is in the possession of the home team, the user places the card so that the field 6 is visible and by grasping the tape 8 moves the indicator 9 step by step in the appropriate direction as the reports of the game are received. If the home team loses the ball to the opposing or visiting team, the card is merely reversed to display the field $6^a$ where the indicator $9^a$, without further manipulation, indicates the proper position of the ball on the field. As long as the ball is in the possession of the visitors the tape 8 is manipulated to move the indicator $9^a$ in the appropriate direction and when the possession of the ball again changes the card is merely turned over (by end for end reversal) in the arrangement illustrated. An arrow or suitable legend on each field indicates the proper direction of advance for the play of a contestant so that likelihood of confusion is minimized.

If desired, a permanent record may be kept by drawing a suitable diagram on the fields 6 and 6ª. Thus a separate record of the play of the contestants may be kept conveniently in connection with the indicator. Data concerning the game or advertising matter may be printed on the panels 11 and 12, if desired.

Having described my invention what I claim as new and desire to protect by Letters Patent is:—

1. In game apparatus for use in connection with audible reports of foot ball games or the like, a card or the like having representations thereon of substantially duplicate fields of play for different contestants, an indicator for the progress of the play on each of said fields and means connecting said indicators for movement in unison.

2. In game apparatus of the class described, a card or the like having on opposite faces representations of fields of play for different contestants and indicators movable in unison on said fields of play respectively to indicate the progress of the game.

3. In game apparatus for use in connection with audible reports of foot ball games or the like, a card or the like having representations thereon of substantially duplicate fields of play for different contestants, an indicator for the progress of the play on each of said fields, and means connecting said indicators for movement in unison, said card having a cut-out portion forming a guide for said connecting means.

4. In game apparatus of the class described, a card or the like having on opposite faces representations of fields of play for different contestants and an endless tape having indicators thereon movable in unison along said fields of play respectively to indicate the progress of the game.

In testimony whereof, I have hereunto signed my name to this specification.

SYDNEY V. HOLMES.